(12) United States Patent
DiFranco

(10) Patent No.: US 11,310,273 B2
(45) Date of Patent: Apr. 19, 2022

(54) SECURE NETWORK AGGREGATION PROTOCOL

(71) Applicant: Rockwell Collins, Inc., Cedar Rapids, IA (US)

(72) Inventor: Ian P. DiFranco, Richardson, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 148 days.

(21) Appl. No.: 16/750,136

(22) Filed: Jan. 23, 2020

(65) Prior Publication Data
US 2021/0234897 A1 Jul. 29, 2021

(51) Int. Cl.
| | |
|---|---|
| *H04L 29/06* | (2006.01) |
| *H04L 29/08* | (2006.01) |
| *G06F 8/61* | (2018.01) |
| *G06F 9/50* | (2006.01) |
| *G06F 8/70* | (2018.01) |
| *G06F 9/455* | (2018.01) |

(52) U.S. Cl.
CPC .............. *H04L 63/18* (2013.01); *G06F 8/61* (2013.01); *G06F 8/70* (2013.01); *G06F 9/455* (2013.01); *G06F 9/5061* (2013.01); *H04L 63/0428* (2013.01)

(58) Field of Classification Search
CPC ....... H04L 63/18; H04L 63/0428; G06F 8/61; G06F 8/70; G06F 9/5061
See application file for complete search history.

(56) References Cited

U.S. PATENT DOCUMENTS

| | | | |
|---|---|---|---|
| 8,214,635 B2 | 7/2012 | Wang et al. | |
| 8,341,395 B2 | 12/2012 | Das et al. | |
| 8,707,032 B2 | 4/2014 | Socky et al. | |
| 9,825,937 B2 | 11/2017 | Ahmavaara et al. | |
| 10,469,268 B2 | 11/2019 | Kawasaki et al. | |
| 10,686,916 B2 * | 6/2020 | Parthasarathy | ......... H04L 45/48 |
| 2013/0185404 A1 | 7/2013 | Patel et al. | |
| 2017/0171191 A1 | 6/2017 | Cignetti et al. | |
| 2019/0103993 A1 | 4/2019 | Cidon et al. | |
| 2019/0116153 A1 | 4/2019 | Deverakonda Venkata et al. | |
| 2019/0149538 A1 | 5/2019 | Friel et al. | |

(Continued)

FOREIGN PATENT DOCUMENTS

| | | | | |
|---|---|---|---|---|
| WO | WO-2015187200 A1 * | 12/2015 | ............. | H04L 45/74 |
| WO | 2016153423 A1 | 9/2016 | | |

OTHER PUBLICATIONS

"Dynamic Application Services in Container Environments"—F5 Container Solutions, May 2018 https://www.f5.com/pdf/solution-center/f5-container-integrations-solutions-overview.pdf (Year: 2018).*

(Continued)

*Primary Examiner* — Randy A Scott
(74) *Attorney, Agent, or Firm* — Suiter Swantz pc llo

(57) ABSTRACT

A system and architecture for containing unique protocols to establish multiple layers of secure communication within a network. Secure data is aggregated, and containers are assigned specific communication ports to maintain distinct, secure communication channels over a single network connection. Each security level is defined by a tenant; each tenant is assigned a unique range of ports for use over the network.

15 Claims, 4 Drawing Sheets

(56) References Cited

U.S. PATENT DOCUMENTS

2019/0260599 A1    8/2019   Williams et al.

OTHER PUBLICATIONS

"Dynamic Resource Management for Application Containers"—Jim Bugwadia, DZone, Integration Zone, Jan. 13, 2016 https://dzone.com/articles/dynamic-resource-management-for-application-contai (Year: 2016).*
Extended Search Report for European Application No. 21153284.1 dated Jun. 21, 2021, 11 pages.

* cited by examiner

SECURE NETWORK AGGREGATION PROTOCOL

BACKGROUND

In networked computer systems, applications often service more than one user at a time, including human users and remote computer systems. Such applications use container data structures to contain data from each user. Each container establishes its own network connection, and may have its own classification level, separate from the application.

Individual containers with separate network connections and separate classification levels creates significant overhead for the network.

SUMMARY

In one aspect, embodiments of the inventive concepts disclosed herein are directed to a system and architecture for containing unique protocols to establish multiple layers of secure communication within a network. Secure data is aggregated, and containers are assigned specific communication ports to maintain distinct, secure communication channels over a single network connection.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
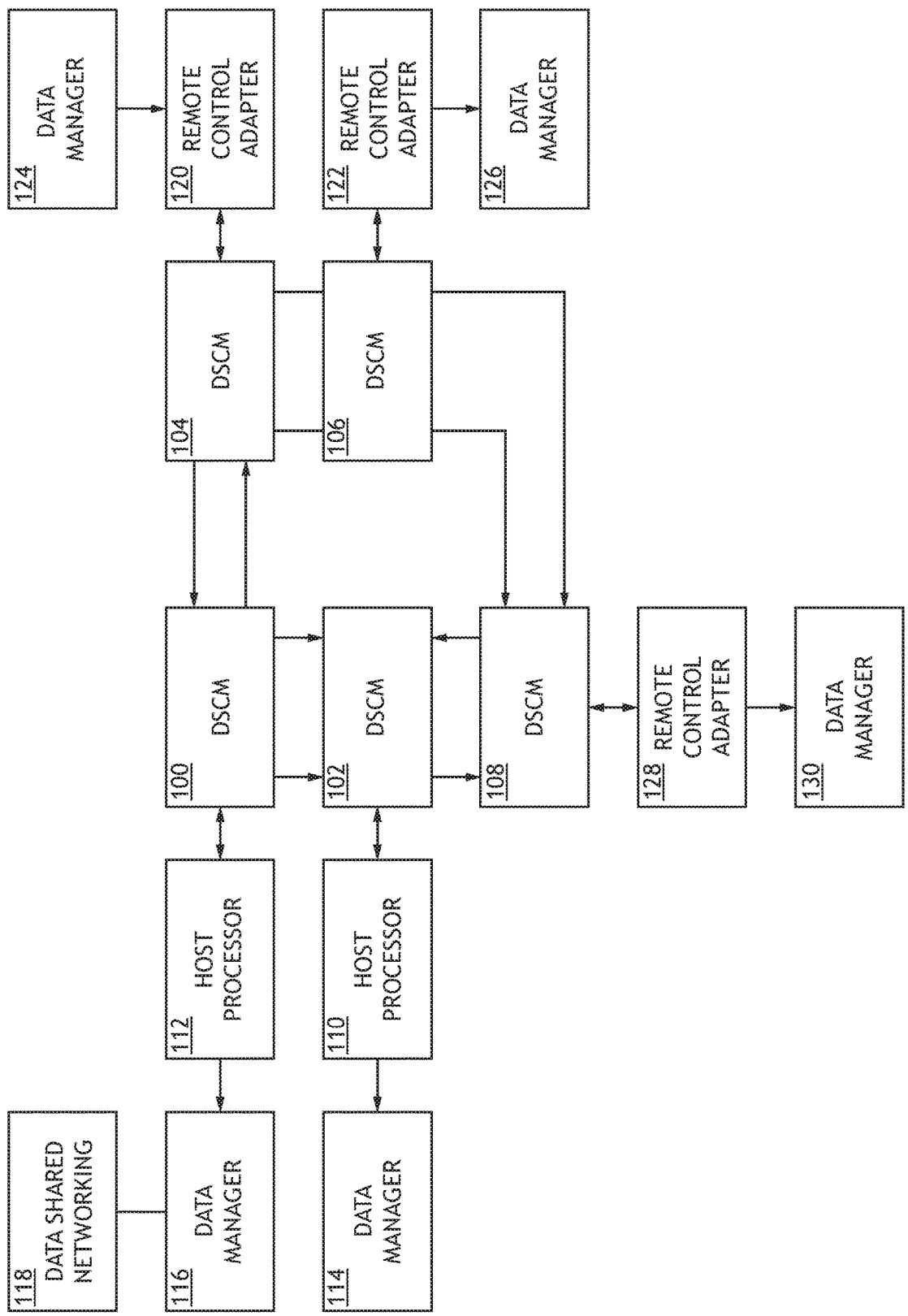
FIG. 1 shows a block diagram of a network architecture according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and architecture for containing unique protocols to establish multiple secure communication networks within a system. Secure data is aggregated, and hybrid (both virtual & physical) networks are assigned specific communication ports to maintain distinct, secure communication channels over a single network cable/media.

Referring to FIG. 1, a block diagram of a secure fiber ring network architecture according to an exemplary embodiment is shown. The network architecture includes one or more dynamic sub-carrier modules 100, 102, 104, 106, 108 and one or more host processors 110, 112 that may execute applications configured to send data having variable levels of classification via the network architecture.

Each host processor 110, 112 may be in data communication with a data manager element 114, 116. The data manager elements 114, 116 may identify classification levels for data utilized by applications on the corresponding host processor 110, 112 and communicate with a corresponding dynamic sub-carrier module 100, 102, 104, 106, 108 to flag containers from the host processor 110, 112 for certain specified ports.

At least one of the data manager elements 114, 116 may be in data communication with a data shard networking element 118.

In at least one embodiment, one or more of the dynamic sub-carrier modules 100, 102, 104, 106, 108 may each be in data communication with a remote-control adapter 120, 122, 128 and corresponding data manager 124, 126, 130.

Figure 2:
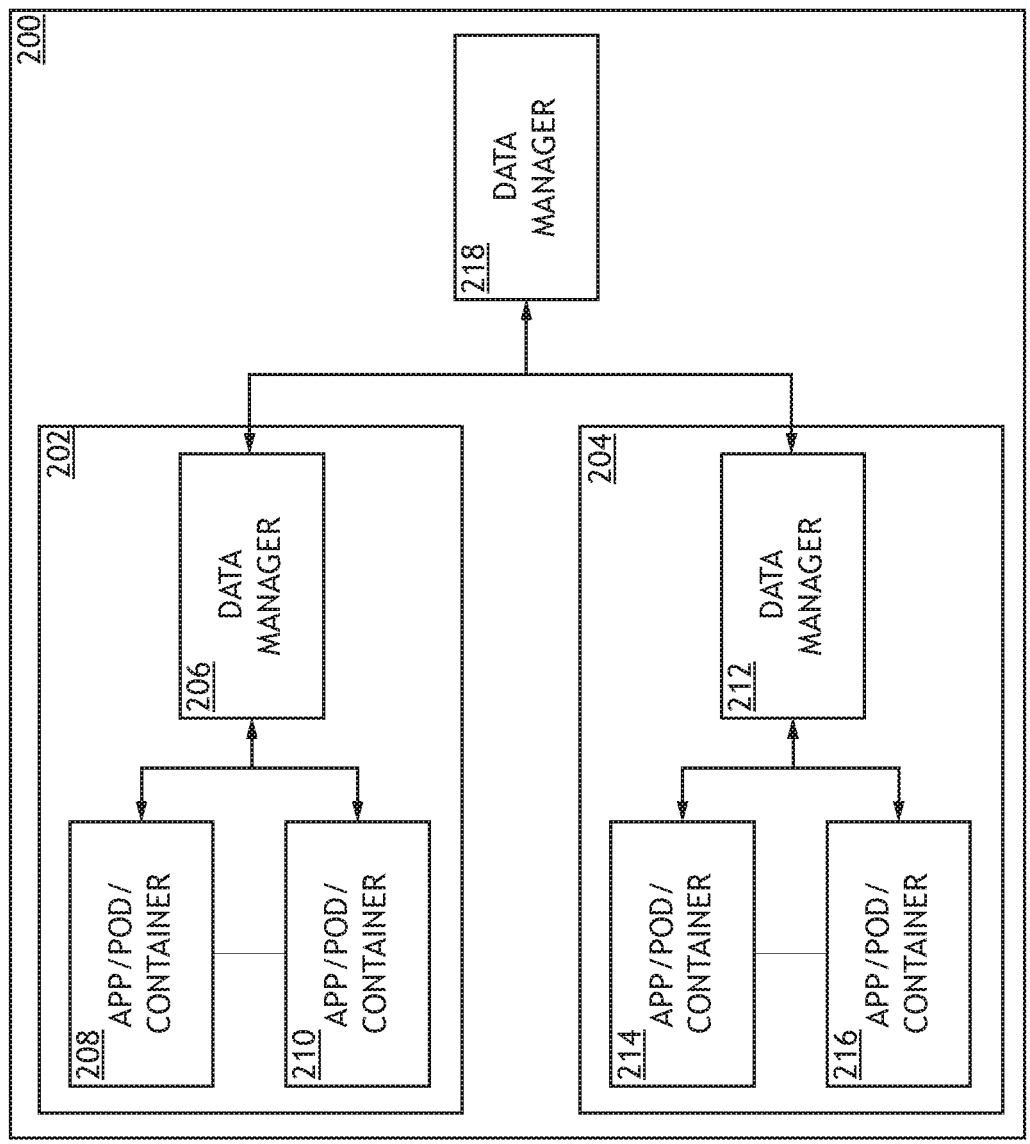
FIG. 2 shows a block diagram of processes in a host processor according to an exemplary embodiment.

Referring to FIG. 2, a block diagram of processes in a host processor 200 according to an exemplary embodiment is shown. A host processor 200 executing an instance of an application establishes a plurality of tenants 202, 204 to segregate internal assets of the host processor 200. Each tenant 202, 204 may allocate one or more pods or containers 208, 210, 214, 216 for containing data packets for external communication. In at least one embodiment, each tenant 202, 204 may instantiate a network stack 206, 212 for managing network connections to the corresponding containers 208, 210, 214, 216.

In at least one embodiment, a data manager 218, external to the tenants 202, 204, is in data communication with the network stacks 206, 212 of each tenant 202, 204. The data manager 218 flags containers 208, 210, 214, 216 based on criteria defined by the contained data, the intended recipient, a classification defined by the producing application, etc.

Figure 3:
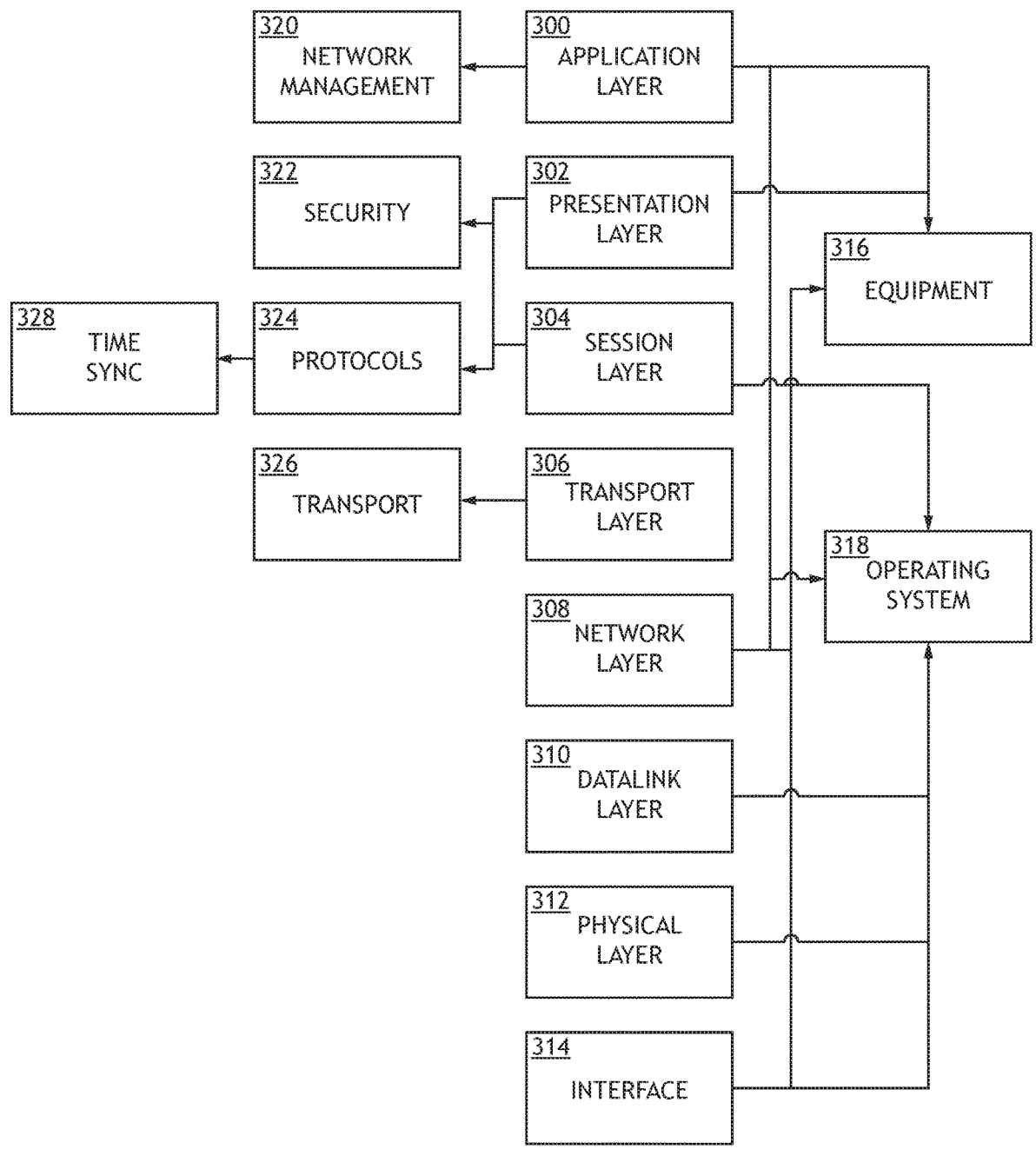
FIG. 3 shows a block diagram for data flow including modules according to an exemplary embodiment.

Referring to FIG. 3, a block diagram for data flow including modules according to an exemplary embodiment is shown. The diagram, generally based on the OSI model of network communication, includes an application layer 300, presentation layer 302, session layer 304, transport layer 306, network layer 308, datalink layer 310, and physical layer 312.

In at least one embodiment, the physical layer 312 is further defined atop an external interface 314 to a dynamic sub-carrier module. The interface 314 may be an ethernet connection.

Each layer 300, 302, 304, 306, 308, 310, 312, 314 may be in data communication with host processor hardware 316 and the operating system 318. Furthermore, the application layer 300 may be in data communication with a network management process 320 to control data traffic into and out of any application level processes.

In at least one embodiment, the host processor operating system utilizes TCP/IP stack, placing data on or receiving data from the stack in a form useful to upper and lower layers of the stack. A security element 322 operating at the presentation layer 302 encrypts and decrypts data in the stack. In at least one embodiment, the host processor uses Transport Layer Security (TLS) 1.3 or higher, utilizing AES-256 as the network encryption algorithm.

In at least one embodiment, the host processor utilizes unique certification authority certificates within each tenant in which each stack is running. Certificates and encryption is the first step in securing data so it is not accessible, viewable, or modifiable by any application of user that exists outside of the tenant. In such embodiments, data will pass outside the tenant unclassified and encrypted.

In at least one embodiment, at the session layer 304, portion of the TCP/IP stack within the architecture maintains network connections and controls ports and sessions. Within this architecture, an instantiation of the stack is produced with each instantiation of a tenant. A tenant contains all instances of the application and supporting data to support execution at a specific data separation level (classification). In at least one embodiment, up to 28 tenants may be running simultaneously on any given host processor and, as a result, up to 28 sets of ports can be defined for each tenant with which to transfer data between computing systems. Port definitions may be defined by protocol module 324. In at least one embodiment, a time sync module 328 ensures that all port definitions are synchronized between dynamic sub-carrier modules on the network. Synchronization may be via a defined list of ports assigned to each tenant. Alternatively, or in addition, a voting algorithm may be used to distribute or re-distribute ports as necessary.

In at least one embodiment, data is encrypted within each tenant using unique certificates for each tenant. Each tenant uses a unique set of defined ports for communication within the tenant; the data will reach the network connection point fully and uniquely encrypted and logically separated from any other data traffic at that physical connection point. A single Ethernet connection may handle all data traffic for the host processor, and the network interface card driver will handle multiple instantiations of itself and the supporting tenants running simultaneously to handle multiple secure networks within the system. Data traffic may be managed at the transport layer 306 by a transport module 326 configured to route data that would traditionally have a separate unique Ethernet connection for each classification versus aggregating those networks across a single network cable media as described within this innovation.

Figure 4:
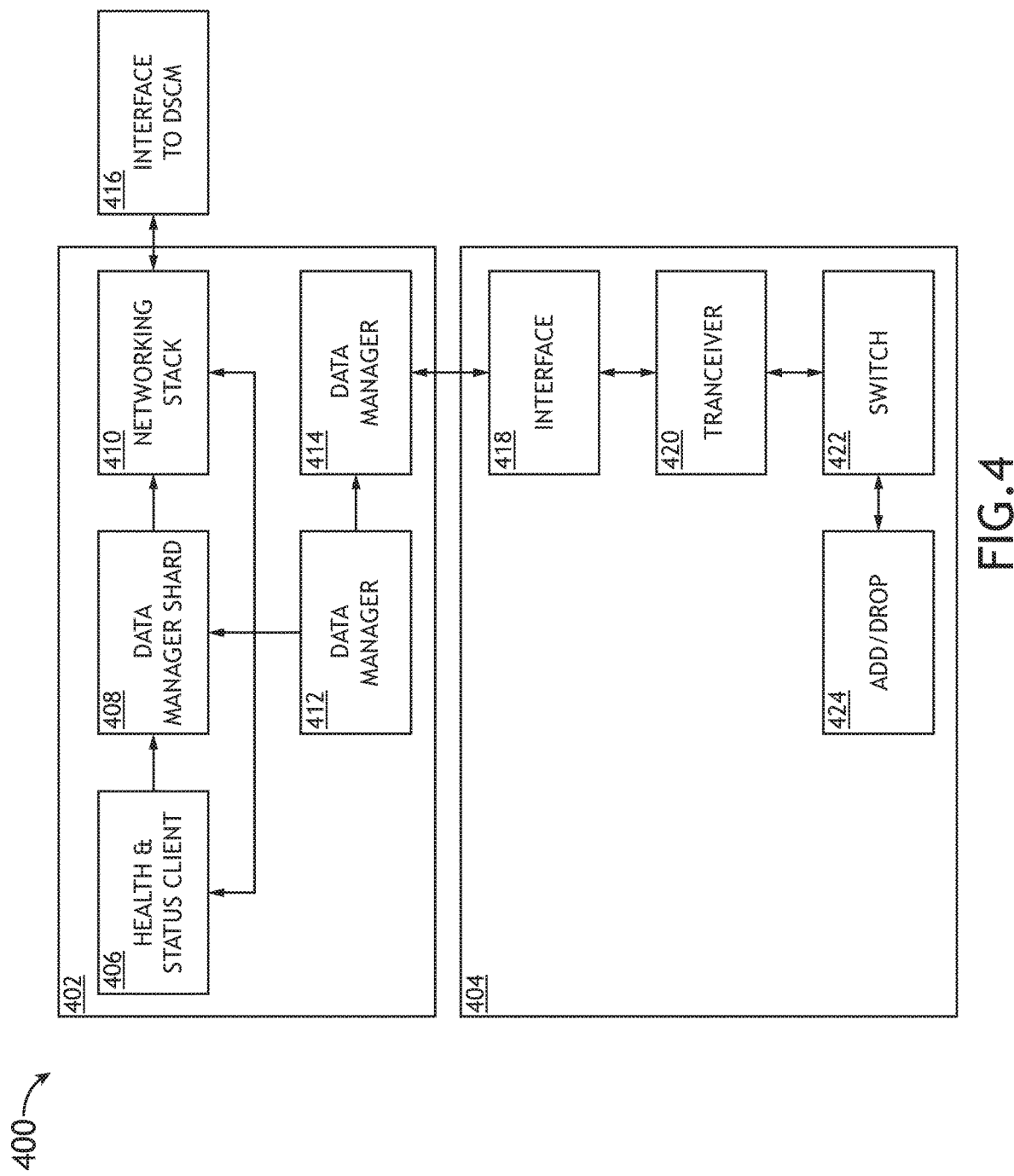
FIG. 4 shows a block diagram of a dynamic sub-carrier module according to an exemplary embodiment.

Referring to FIG. 4, a block diagram of a dynamic sub-carrier module 400 according to an exemplary embodiment is shown. The dynamic sub-carrier module 400 may be a separate network component disposed to intercept all network traffic form a host processor. Alternatively, the dynamic sub-carrier module 400 may be embodied in one or more processes executing on the host processor.

In at least one embodiment, the dynamic sub-carrier module 400 may comprise a set of data managing components 402 that send and receive traffic to and from commercial network components 404 (including a network interface 418, transceiver 420, digital signal processor and switch 422, and a network add/drop component). The data managing components 402 may comprise network interface shim 414 in data communication with the network interface 418 such as fiber optic or electric interface. In at least one exemplary embodiment, the network media may comprise a fiber optic ring network with up to 28 unique tenants at 200 Gbps each; the tenants are always available. The network interface shim 414 provides encrypted data to the network media based on TCP port number to and from the up to 28 unique tenants. The network interface shim 414 has no knowledge of the network configuration. The network interface shim 414 sends and receives data to and from a dynamic sub-carrier module network manager 412 which may add packets to a network stack 410. The network stack 410 sends and receives data to external sources via one or more dynamic sub-carrier module external network interfaces 416. Such dynamic sub-carrier module external network interfaces 416 may include an Ethernet interface, a fiber optic interface, etc.

In at least one embodiment, the dynamic sub-carrier module network manager 412 is aware of the network configuration across all tenants. Based on data when each connection for each tenant is established, the dynamic sub-carrier module network manager 412 instructs the network interface shim 414 which tenant wishes to connect.

A data manager shard 408 in data communication with the dynamic sub-carrier module network manager 412 categorizes data according to the tenant sending and/or receiving the data, and applies and appropriate flag to route the data to a port within a range defined for the tenant.

The data manager shard 408 retains and collect data across all dynamic sub-carrier modules 400 on the network, and retains awareness of the local and global network configuration, changes, errors. In at least one embodiment, a health and status client 406 monitors the data manager shard 408 and dynamic sub-carrier module network manager 412 reports such changes and applies fixes appropriate for such failures on-the-fly. The data manager shard 408 and health and status client 406 may comprise components of the dynamic sub-carrier module network manager 412.

In at least one embodiment, the dynamic sub-carrier module network manager 412 receives the initial port configurations at startup and passes that information to a single master tenant at each node of the network. The dynamic sub-carrier module network manager 412 may send and define bandwidth expectations based on traffic for specific tenants and pass that information to other components. At startup, the master tenant receives all pertinent information for a node, including all information, beyond ports, that would be required for a node to run at full capacity.

In at least one embodiment, the transport mechanism may dynamically change the bandwidth of a given fiber optic channel based on information provided to it within the dynamic sub-carrier module 400. To maintain 200 Gbps per channel a max of 28 unique channels is maintained.

In at least one embodiment, each shard, through the host processor, receives the configuration and number of nodes, tenants, pods, or containers that will be running at each host processor. Data is stored on the shard that defined the number of ports that will be used within a tenant. A tenant is a mechanism to segregate and separate one tenant from another tenant, and prevent any other tenant from having any knowledge or access to any of processes or data stored or running the tenant. If the network media used is a fiber optic cable, up to 28 channels, and subsequently, 28 unique tenants can exist within the network, each running at 200 Gbps. Within each tenant the system will be able to privately assign port numbers 49152 through 65535.

In at least one embodiment, because the dynamic sub-carrier module 400 needs to know the unique port numbers usable per tenant, the port numbers may be assigned as follows:

| Tenant | Port Range |
| --- | --- |
| 1 | 49152-49737 |
| 2 | 49738-50322 |
| 3 | 50323-50907 |
| 4 | 50908-51492 |
| 5 | 51943-52077 |
| 6 | 52078-52662 |
| 7 | 52663-53247 |
| 8 | 53248-53832 |
| 9 | 53833-54417 |
| 10 | 54418-55002 |
| 11 | 55003-55587 |
| 12 | 55588-56172 |
| 13 | 56173-56757 |
| 14 | 56758-57342 |
| 15 | 57343-57927 |
| 16 | 57928-58512 |
| 17 | 58513-59097 |
| 18 | 59098-59682 |
| 19 | 59683-60267 |
| 20 | 60268-60852 |
| 21 | 60853-61437 |
| 22 | 61438-62022 |
| 23 | 62023-62607 |
| 24 | 62608-63192 |
| 25 | 63193-63777 |
| 26 | 63778-64362 |
| 27 | 64363-64647 |
| 28 | 64948-65535 |

In at least one embodiment, the system may utilize AES-256 to protect information up to the "Top Secret" level. The system may also utilize a National Security Algorithm Suite.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   at least one network interface device; and
   at least one host processor in data communication with a memory storing processor executable code for configuring the at least one host processor to:
   instantiate a data manager process thread;
   instantiate a dynamic sub-carrier process thread; and
   instantiate at least one application configured to provide data to a plurality of users at a plurality of classification levels,
   where:
   the data manager process thread is configured to:
   receive a data packet from the at least one application, the data packet associated with one of the plurality of classification levels;
   identify the associated classification level of data packet;
   create a container data structure to contain the data packet, the container data structure including a flag indicating the associated classification level; and
   set the flag of the container data structure to the classification level; and
   the dynamic sub-carrier process thread is configured to:
   identify a flag of every outbound container data structure; and
   route the outbound container data structure to a port range specific to the flagged classification level.

2. The computer apparatus of claim 1, wherein the at least one host processor is further configured to instantiate a data shard networking element.

3. The computer apparatus of claim 1, further comprising a datalink connection to a remote-control adapter.

4. The computer apparatus of claim 3, wherein the remote-control adapter is in data communication with the data manager process thread.

5. The computer apparatus of claim 1, wherein the data manager process thread is further configured to:
   receive a definition of one or more tenants at startup; and
   define a port range for each of the one or more tenants.

6. The computer apparatus of claim 5, wherein the definition of each tenant comprises a unique security certificate.

7. The computer apparatus of claim 5, wherein the data manager process thread is further configured to:
   instantiate a master tenant; and
   transfer all port definitions to the master tenant.

8. A network system comprising:
   a plurality of network node devices, each of the plurality of network node devices comprising:
   at least one network interface devices; and at least one host processor in data communication with a memory storing processor executable code for configuring the at least one host processor to:
instantiate a data manager process thread;
instantiate a dynamic sub-carrier process thread; and
instantiate at least one application configured to provide data to a plurality of users at a plurality of classification levels,
where:
the data manager process thread is configured to:
receive a data packet from the at least one application, the data packet associated with one of the plurality of classification levels;
identify the associated classification level of data packet
create a container data structure to contain the data packet, the container data structure including a flag indicating the associated classification level; and
set the flag of the container data structure to the classification level; and
the dynamic sub-carrier process thread is configured to:
identify a flag of every outbound container data structure; and
route the outbound container data structure to a port range specific to the flagged classification level.

9. The system of claim 8, wherein the at least one host processor is further configured to instantiate a data shard networking element.

10. The system of claim 8, further comprising a datalink connection to a remote-control adapter.

11. The system of claim 10, wherein the remote-control adapter is in data communication with the data manager process thread.

12. The system of claim 8, wherein the data manager process thread is further configured to:
receive a definition of one or more tenants at startup; and
define a port range for each of the one or more tenants.

13. The system of claim 12, wherein the definition of each tenant comprises a unique security certificate.

14. The system of claim 12, wherein the data manager process thread is further configured to:
instantiate a master tenant; and
transfer all port definitions to the master tenant.

15. The system of claim 12, wherein the dynamic sub-carrier module is further configured to share tenant port range definitions with other dynamic sub-carrier process threads on the network.

* * * * *